Jan. 9, 1951          L. G. TROREY          2,537,718
PHOTOGRAMMETRIC APPARATUS

Filed Feb. 7, 1947          2 Sheets—Sheet 1

Inventor
L. G. Trorey
By Glascock Downing Seibold
attys.

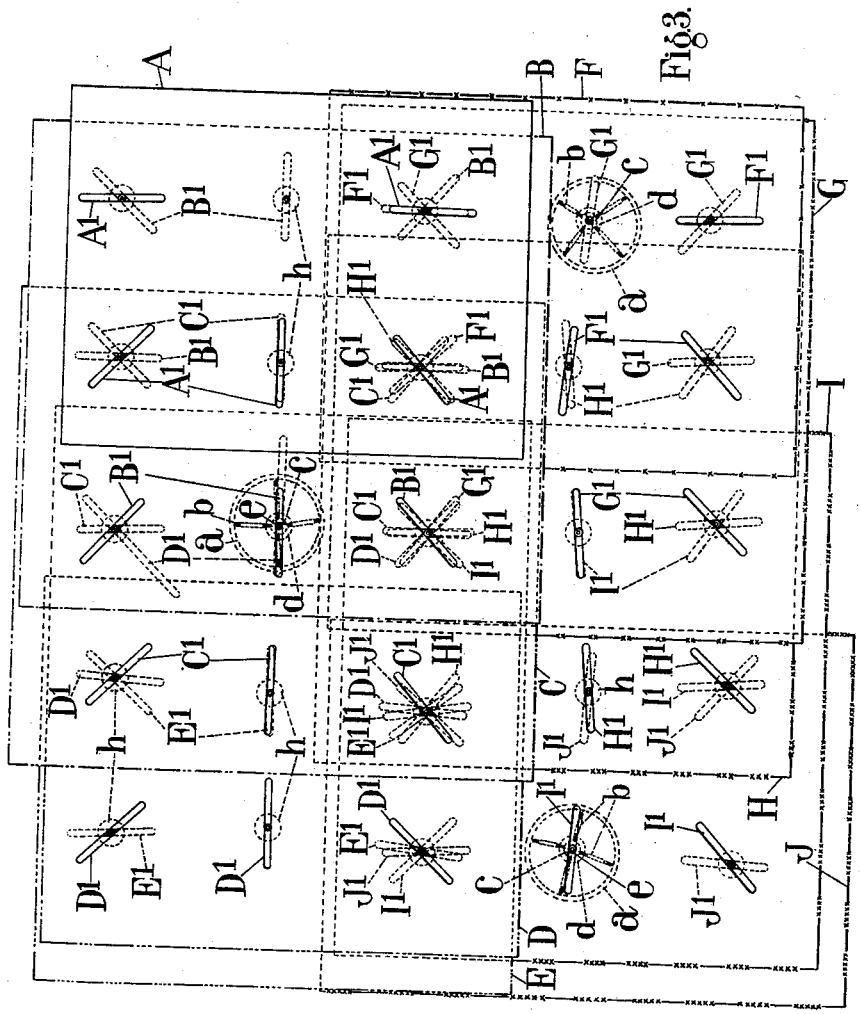

Patented Jan. 9, 1951

2,537,718

UNITED STATES PATENT OFFICE 2,537,718

PHOTOGRAMMETRIC APPARATUS

Lyle Graeme Trorey, Surrey, England

Application February 7, 1947, Serial No. 727,025
In Great Britain October 1, 1945

3 Claims. (Cl. 33—1)

This invention relates to photogrammetric apparatus.

In the making of maps, charts, and the like from aerial photographs it is usual to take a series of strips of overlapping photographs on each of which is a principal point and two minor control points, the overlap being such that the principal point and the two minor control points of each view appear on each adjoining photograph. As well adjoining strips of the series overlap laterally, the said minor control points being sited on the common lateral overlap. From the photographs a series of slotted transparent templates is produced from which is made a triangulation. These are then located and held in proper overlapping relation (corresponding to the overlapping relation of the photographs) upon the control grid board by the use of suitable studs passed through the intersections of the slots in the templates.

Formerly the control points have been established by trigonometric or other ground survey to a high degree of precision, in fact to much closer limits than can be plotted at the scale of the control grid, and in such cases the slotted templates accurately adjust the photo triangulation to these fixed points.

However radar is now being largely applied in aerial survey and in such application an entirely different situation exists as the radar fixes the result in planimetric co-ordinates of each air station, that is to say, of each plumb point, and these radar positions are found to have probable errors, at scales in ordinary use, of several millimetres. The nature of these errors is such that (probably) each point lies within a circle of two to four millimetres radius centred upon the true grid position, the radius depending upon the precision of the radar system used and, of course, upon the scale at which the work is carried out. It therefore becomes necessary to adjust the photo-triangulation to control points which cannot be regarded as fixed and to obtain the most probable fit thereto as it is impossible to use the plumb points as control in the ordinary way since the templates are too rigid to take up the probable error, and even if they were not the resultant minor control positions would contain local errors of the same order as those of the radar positions while at the same time the plumb points themselves would still be unadjusted. Mathematical solution can be effected by the method of least squares in accordance with ordinary geodetic procedure in the adjustment of triangulation to astronomical observations. This procedure is, however, lengthy and moreover not justified by the strength of the basic data.

The object of the present invention is to overcome the above difficulties by providing some mechanical means of obtaining a best mean fit between the photogrammetric and the positions of the plumb points, and I arrange for this by providing flexible means for fixing the plumb points in association with the rigid templates.

The invention consists in photogrammetric apparatus comprising in combination a control grid board, slotted templates assembled thereon and means for locating on the grid board the principal or plumb points determined by radar, astronomical or other control, said locating means having means for fixing the same to the grid board with respect to the plumb points and means for engaging the slotted templates, the engaging means being mounted for resilient movement in relation to the fixing means in a plane parallel to the grid board.

The accompanying drawings illustrate one convenient mode of carrying out the invention.

Figure 3 is a plan showing a part of a typical lay-out of templates showing three studs in operation.

Figure 1:
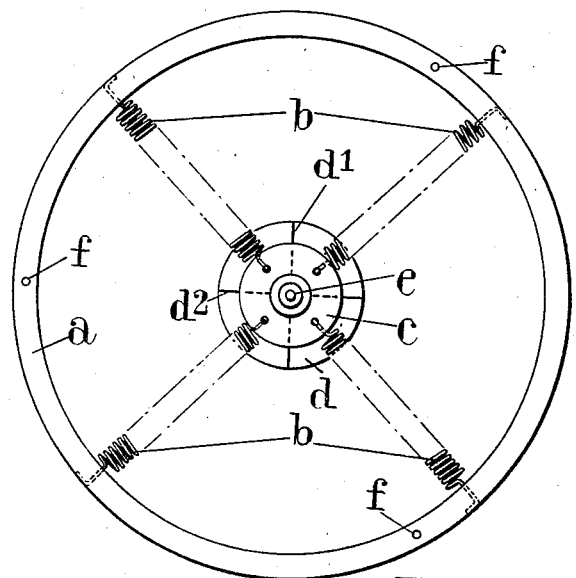
Figure 1 is a plan of a suitable form of point marking device.
Figure 2:
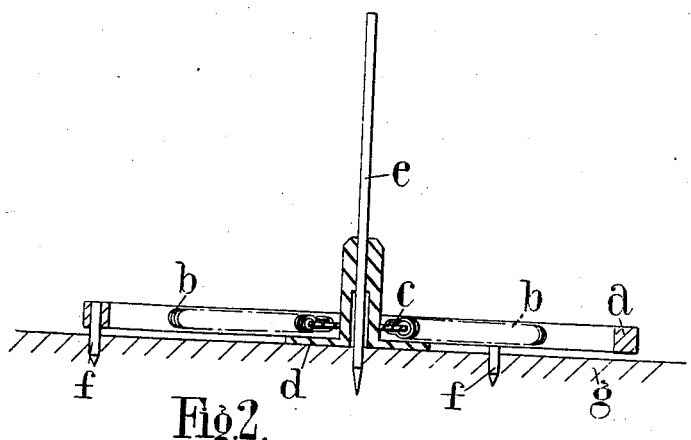
Figure 2 is a sectional elevation.

In carrying my invention into effect in one convenient manner I provide a circular, polygonal, or other suitable frame $a$ having at suitable points in its periphery means for attachment of, say, four or other number of springs $b$, the other ends of which are indirectly attached to a stud member of the transparent plastic type and which may be similar to the studs at present used with the slotted templates, and having a bore therethrough by means of which the stud may be finally fixed in position by means of a pricker or the like. The springs are secured to a member $c$ in which the stud $d$ with the axial bore therethrough has a sliding push fit and the stud or the member carrying the same is furnished with suitable collimating lines $d'$ $d^2$ or marks registered to the centre of the stud pin hole or bore. The pricker is shown at $e$.

Upon the under surface of the frame $a$ carrying the floating stud I provide short pins $f$ or other means by which the frame may be fixed to the grid board $g$.

The tension of the springs is such that the rigidity of the stud in resisting the displacements in the plane of the grid is of the same order as that of the template assembly itself but sufficient strong as to cause buckling of the assembly.

In operation the radar plumb points are plotted on the grid and a stud assembly is placed accurately over each plumb point position (as shown in the lay-out in Figure 3 in which three of such studs are shown), the transparent stud being registered over the plotted position by means of the collimating marks $d'$ $d^2$, and the telescopic nature of the stud, when such is employed, facilitates such adjustment by allowing the bottom of the stud to contact the grid. As each stud assembly is thus accurately positioned upon the grid, the frame $a$ is lightly tapped with a suitable tool to drive in the pins so as to fix the frame rigidly to the grid board. The templates are then assembled and fitted in the usual manner, the minor control points being located by the use of ordinary studs $h$ (Figure 3), and it will be found that the floating studs, movable under the restraint of the springs, will have been displaced from the central position by an amount which is a function of the positional error of an individual plumb point, and the displaced or adjusted plumb point positions are now marked in the usual way by pricking through the central hole of the stud. All three studs are shown thus displaced in Figure 3.

By the ordinary principles of the theory of errors its is evident that the residual errors both in plumb point and in minor control positions will be of a smaller order to magnitude than those of the radar co-ordinates themselves.

In Figure 3 the various slotted templates are denoted by the reference latters A, B, C, D, E, F, G, H, I and J, and the slots appertaining to these templates are denoted by references A', B', C', D', E', F', G', H', I' and J' respectively. Moreover, for greater clarity, each template is denoted by boundary lines of different forms which will be apparent from inspection of the drawing.

It will be understood that the invention is not limited to any particular form of frame or stud nor to any particular number and disposition of springs controlling the same nor to any particular materials from which the various parts may be formed as these and other details may be variously modified to suit any practical requirements that may have to be fulfilled.

Further, while I have referred above to radar fixes, it will be understood that the invention is applicable with control points fixed by astromical or other control which is not precise, and also with other mechanical triangulators instead of slotted templates, which term is used herein generically to cover all similar mechanical triangulators.

I claim:

1. Photogrammetric apparatus comprising in combination a control grid board, slotted templates assembled thereon and means for locating on the grid board the principle or plumb points determined by radar, astronomical or other control, said locating means having fixing means for fixing the same to the grid board with respect to the plumb points, engaging means for engaging the slotted templates and resilient spring means for supporting the engaging means normally in a predetermined position in relation to the fixing means and allowing restricted movement in relation to the fixing means in a plane parallel to the grid board.

2. Photogrammetric apparatus according to claim 1 in which the locating means includes a frame, the resilient spring means being attached at one of their ends at spaced distances around the said frame the other ends being attached to the said engaging means.

3. Photogrammetric apparatus according to claim 2 in which the engaging means includes a washer formed with an axial bore therethrough for insertion of a stud usually employed with slotted template assemblies.

LYLE GRAEME TROREY.

REFERENCES CITED

The following references are of record in the file of this patent:

UNITED STATES PATENTS

| Number | Name | Date |
|---|---|---|
| 1,915,466 | Lilly | June 27, 1933 |
| 2,233,696 | Eliel et al. | Mar. 4, 1941 |
| 2,293,416 | Terpening | Aug. 18, 1942 |
| 2,367,341 | Dresser | Jan. 16, 1945 |

FOREIGN PATENTS

| Number | Country | Date |
|---|---|---|
| 307,767 | Germany | Sept. 6, 1919 |